Patented Nov. 12, 1929

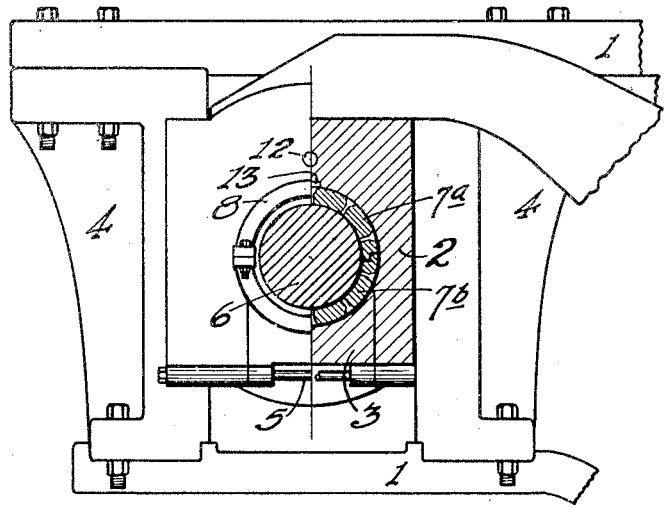
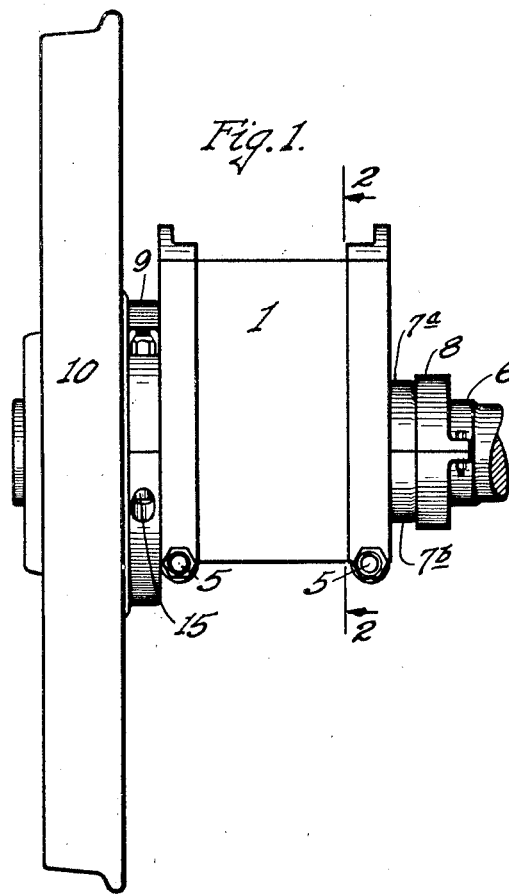
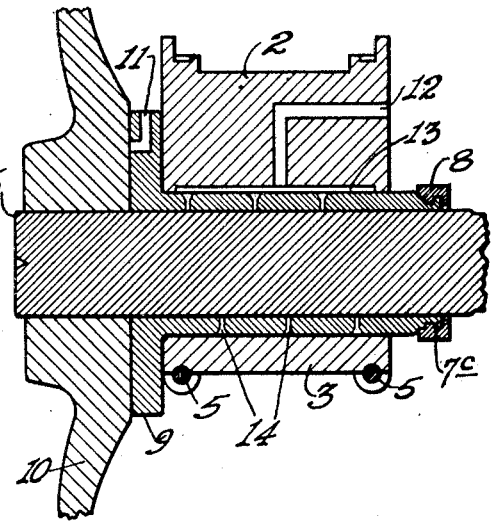

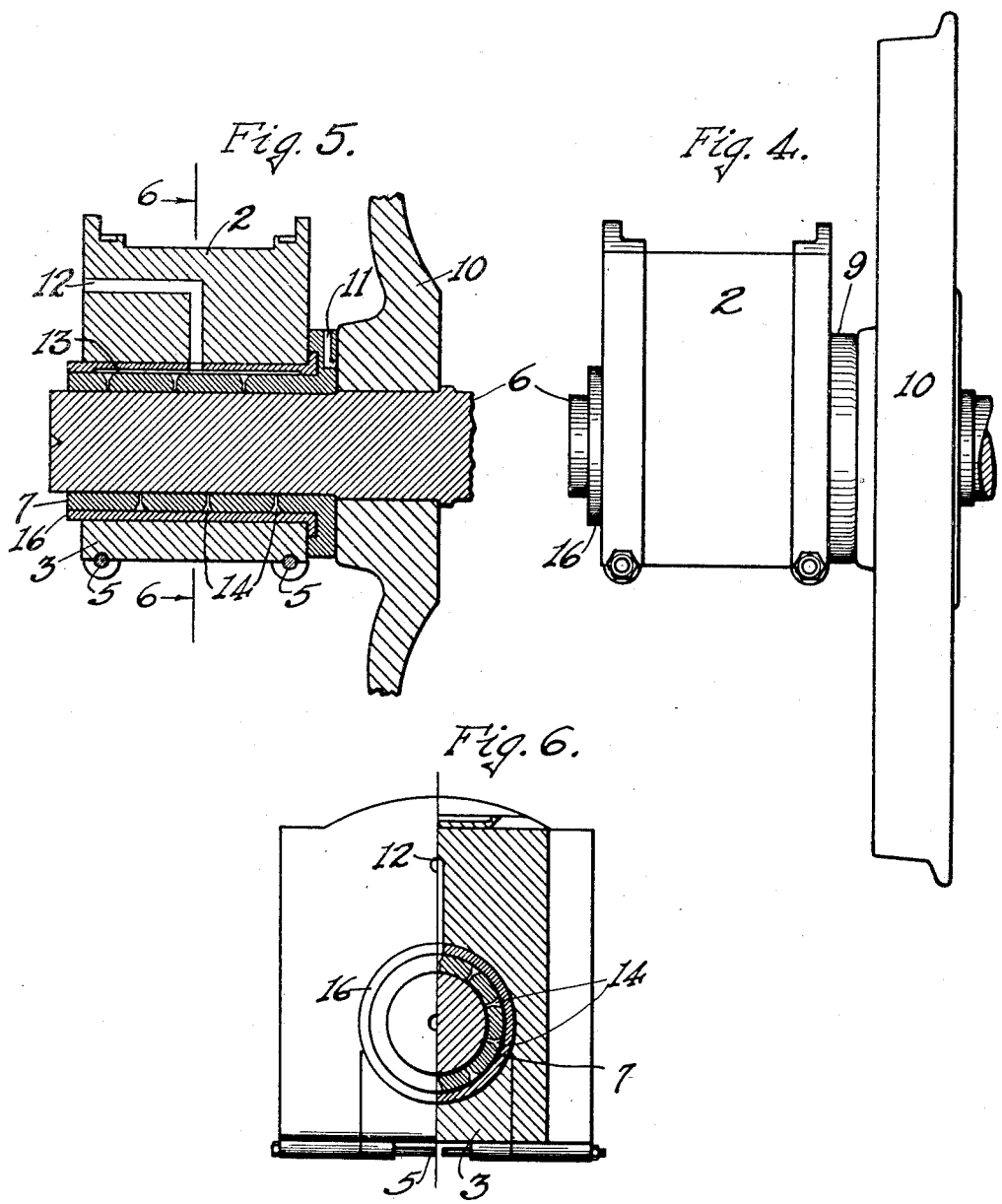

1,735,258

UNITED STATES PATENT OFFICE

JOHN J. MELLEY AND JOHN W. CHAPMAN, OF PARSONS, KANSAS, ASSIGNORS OF ONE-THIRD TO W. H. HECKMAN, OF CHICAGO, ILLINOIS

RAILWAY-JOURNAL-BOX ASSEMBLY

Application filed August 13, 1927. Serial No. 212,758.

This invention relates to the improvements in railway journal box assemblies and refers more particularly to journal box assemblies for locomotives or car trucks. It applies to both inside journal bearings and outside journal bearings.

Among the objects of the invention is to provide journal box assemblies in which a solid block or journal box is used in place of a box having an oil or waste well, the solid boxes or blocks carrying rotatable bearings. Further novelty of the invention lies in the combined journal bearing and hub liner structure, one end of the bearing terminating in a flange-like member which serves the purpose of a hub liner or spacer.

Figure 1 is a side elevation view of a wheel and inside journal box assembly.

Figure 2 is a half sectional view taken along the line 2—2 in Figure 1.

Figure 3 is a central sectional view of the box shown in Figure 1.

Figure 4 is a side elevational view of an outside journal box assembly.

Figure 5 is a sectional view of the assembly shown in Figure 4.

Figure 6 is a half sectional view taken along the line 6—6 in Figure 5.

Referring to the drawings, in Figure 2 is shown the truck frames 1. The inside journal box, consisting of an upper portion 2 and a lower removable portion 3, is supported in the jaws 4 of the frame. In Figures 1, 2 and 3, is shown an inside journal box assembly comprising a journal box, a split bearing and a clamp, hereinafter described in more detail. In Figures 4, 5 and 6, is shown an outside journal box assembly comprising a box, a solid bearing and a bearing liner or sleeve. The lower removable portion 3 slides from the upper portion so that the box can be more easily mounted upon the journal. Bolts 5 extend through flanges of the upper and lower portion of the box to hold the removable slide block 3 in position.

Within the journal box 2 and surrounding the journal 6 is a split cylindrical rotatable bearing, comprising an upper portion 7ª and a lower portion 7ᵇ, the bearing considered as a whole as 7. The inside end of the bearing extends somewhat beyond the box and terminates in a collar or flanged portion 7ᶜ upon which is affixed a clamp 8. The opposite end of the bearing is formed into a disk-like hub liner 9 and fills the space between the wheel 10 and the outside surface of the box 2. The bearing surface between the wheel and the hub liner is oiled from a grease cup or other suitable greasing means, through the grease duct 11. The bearing 7, rotatable in the box is lubricated by means of a lubricant supplied through a grease duct 12 which communicates with an oil groove 13, by means of which the grease or oil is distributed to the holes 14 and thence uniformly spread upon the surface of the journal. The clamp 8 and bolts 15 which hold together the halves of the hub liner serve to unite the portion 7ª and 7ᵇ of the bearing as a single bearing unit.

As suggested, this combined bearing and hub liner is rotatable within the box and furnishes an efficient and adequately lubricated bearing surface between the box and the journal.

Referring now to the outside journal box assembly shown in Figs. 4, 5 and 6, again the assembly consists of a box 2 with a removable slide block 3 held in place by bolts 5. The rotatable bearing 7 in the outside journal assembly may be either a solid cylindrical bearing as shown or a split bearing as described in connection with Figs. 1, 2 and 3. The bearing 7 extends slightly beyond the box as shown in Figs. 4 and 5, but in the case of a solid bearing, the clamp 8 and the bolts 15 of the slip bearing have been eliminated. For outside bearings, a solid box can be used, eliminating slide block 3 and bolts 5.

The lubrication of the hub liner 9 of the rotatable bearing 7 is the same as that shown in Figs. 1, 2 and 3.

As an optional construction in Figs. 4, 5 and 6 there is shown an auxiliary liner or sleeve 16 which is positioned between the box and the bearing proper. This sleeve is replaceable so that the wear upon the box may be entirely eliminated, thus permitting replacing the sleeve instead of the box in case of wear.

The use of a split bearing in the inside journal assembly is occasioned by the difficulty experienced in changing the bearings, while this difficulty is not present in the replacing of bearings and boxes in an outside bearing such as the usual type.

It is recognized that heretofore hub liners have been used to separate the box from the wheel and to serve as a bearing surface between the boxes and the wheels, but it is thought to be novel to combine a rotatable bearing and hub liner in a unitary construction. The bearing surrounding the journals gives a better bearing surface which is more adequately lubricated and receives without stress or strain on the frame or box the thrusting strains occasioned by the movement of the rolling stock. It also reduces friction on the bearings and lateral or hub liners, and eliminates the necessity of removing boxes and wheels to take up lateral motion. Also, it eliminates the use of the present oil waste and grease cellar, which at present is being used on axle and journal bearings on all railroads.

We claim as our invention:

A railway journal box assembly comprising a journal box enclosing a floating rotatable split bearing brass surrounding the axle and having a holding clamp at its inner extremity, and a hub liner integral with the rotatable bearing and positioned between the journal box and the wheel.

JOHN J. MELLEY.
JOHN W. CHAPMAN.